United States Patent
Sekmakas et al.

[15] 3,666,649
[45] May 30, 1972

[54] POLYACRYLIC ACID IN ELECTROCOATING

[72] Inventors: Kazys Sekmakas, Chicago; Lester A. Henning, Buffalo Creek, both of Ill.

[73] Assignee: De Soto, Inc., Des Plaines, Ill.

[22] Filed: Oct. 3, 1969

[21] Appl. No.: 863,701

[52] U.S. Cl. .................................................. 204/181
[51] Int. Cl. ...................................... B01k 5/02, C23b 13/00
[58] Field of Search ................................................. 204/181

[56] References Cited

FOREIGN PATENTS OR APPLICATIONS

| | | | |
|---|---|---|---|
| 1,506,950 | 11/1967 | France | 204/181 |
| 1,168,269 | 10/1969 | Great Britain | 204/181 |

*Primary Examiner*—Howard S. Williams
*Attorney*—Dressler, Goldsmith, Clement & Gordon

[57] ABSTRACT

High molecular weight polyacrylic acid polymers are added in small amount to an aqueous material containing dispersed carboxy-functional resin to improve electrodeposition at the anode and to lower the gloss of the coating which is deposited.

12 Claims, No Drawings

POLYACRYLIC ACID IN ELECTROCOATING

The present invention relates to the electrodeposition of acidic resins from aqueous medium on the anode of a unidirectional electrical system. In these electrodeposition processes, which may be referred to as anodic electrophoretic deposition it is frequently desired to deposit coatings of low gloss and this is sometimes difficult when the proportion of binder is large in order to insure that adequate resin will be deposited on all portions of the piece to be coated. In addition to the factor of reduced gloss, electrodeposited coatings frequently encounter other difficulties such as a tendency to pinhole or crater or a tendency to rupture when the electrodepositing voltage is increased in an effort to improve the rapidity of electrodeposition and the throwing power of the system.

In accordance with the present invention, it has been found that a small proportion, usually from 0.1 percent to 3 percent, of a relatively high molecular weight polyacrylic acid emulsion polymer unexpectedly functions to lower gloss, improve film continuity and uniformity and to improve the electrodeposition characteristics when the same is incorporated into an aqueous system containing a dispersed carboxy-functional resin adapted for anodic deposition.

The aqueous electrocoating systems which are modified by the invention are those in which a resin is dispersed in water by virtue of salt formation involving a base and carboxyl functionality in the resin. The carboxyl functionality may be quite large, e.g., up to about an acid number of 300, or it may be quite small, e.g., as low as about 5 in a resin having other functional groups such as hydroxy groups which ease the burden of water association. Preferred acid numbers are from 12-80, more preferably from 15-50.

The action of the polyacrylic acid is complex, but is believed to involve a very fine surface irregularity which eliminates craters and pinholes and disperses light irrespective of whether the composition is clear or pigmented. The action is most noticeable at the smaller proportion of use when the resin is an acrylic polymer, but the action takes place regardless of the resin type.

The elimination of craters and pinholes will take place at proportions of use smaller than is required for significant diminution of gloss.

So little polyacrylic acid is needed that the acidity added thereby is not detectable. Indeed, the presence of the polyacrylic acid cannot be detected by any technique that has been used.

The polyacrylic acid is consumed preferentially (deposited 2½ to 3 fold faster than the acidic resin) and must be replaced more rapidly to maintain the desired concentration.

While this factor is not critical, the polyacrylic acid is normally used in a bath having a pH of from 7-9.5. It should be noted, however, that unless there is an excess of amine available, introduction of the acid will cause localized gelation so the polyacrylic acid is usually added after it has been neutralized with amine and diluted to 2½ percent solids.

The polyacrylic acid does not help to disperse the pigment and broadly can be added at any time and in any manner, the preferred addition procedure being noted above.

As to other desirable results which follow from the addition of polyacrylic acid, the rupture voltage of the deposited film is increased, frequently by about 50 volts, and film thickness is reduced, usually about 0.1-0.2 mils.

The polyacrylic acid polymer should be of high molecular weight as is normally provided by polymerization in bulk or in aqueous emulsion. High molecular weight is estimated to be about 20,000 or higher as measured using an Ostwald Viscosimeter. The emulsion polymer is particularly preferred.

The polyacrylic acid polymer may be constituted by polymerized acrylic or methacrylic acid, methacrylic acid being preferred and the acid component of the polymer may constitute 100 percent of the polymer or less, down to about 20 percent. Larger proportions of from 40 percent or more are particularly preferred.

The balance of the polyacrylic acid polymer may be constituted by diverse monoethylenically unsaturated monomers, and especially by esters of acrylic acid with monohydric alcohols containing from one to four carbon atoms such as ethyl acrylate. There is desirably included a proportion of monomer providing hydroxy functionality, as by the inclusion of hydroxy ethyl acrylate and the like in an amount of up to about 20 percent, preferably from 3-15 percent.

The specific technique used for emulsion polymerization is not critical, but high molecular weight is significant and the much higher molecular weight provided by emulsion polymerization in contrast with solution polymerization is well known.

As is well known, bases as a class are useful to solubilize the acidic resin which is utilized, but nitrogenous bases and particularly amines such as triethyl amine are especially preferred.

The coating compositions of the invention are aqueous, but this is not intended to exclude the presence of water-miscible organic solvents, which are frequently used as is known, to assist in coupling the acidic resin to the water of the aqueous phase. 2-ethoxy ethanol, methyl ethyl ketone, and the like will serve to illustrate these water-miscible organic solvents. The coating compositions of the invention may be used pigmented or clear, titanium dioxide rutile being used in the accompanying examples to illustrate a pigmented system.

The acidic resin which is utilized in the invention may vary considerably as is well known in the art of aqueous coatings, so long as the resin can be dispersed in water with the aid of a base. In the invention, it has been found that the polyacrylic acid is especially beneficial to acidic acrylic copolymers which are here defined as being addition polymers comprising at least 25 percent by weight of $C_1 - C_4$ alkyl ester of acrylic acid. On the other hand, copolymers of styrene and allyl alcohol can be used as the building block upon which to base the acidic resin and this can be done by reacting a portion of the hydroxy functionality with a fatty acid and then reacting some of the balance of the hydroxy functionality with a polycarboxylic acid anhydride, illustrated by trimellitic anhydride. Epoxy resins and polyether resins can also be used as the base upon which to build the acidic resin.

The acidic resins may be used alone, but it is preferred to employ them in the aqueous medium in combination with an aminoplast resin which is generally defined as a heat-hardening condensation product of an aldehyde, such as formaldehyde, with a polyamine, such as urea, melamine or benzoguanamine.

The preferred aminoplast resins are water insoluble aminoplast resins, especially those based on benzoguanamine. These are heat-hardening water insoluble condensates of benzoguanamine with a stoichiometric excess of formaldehyde and are, per se, well known. While these do not disperse well in water, per se, they do disperse in the presence of hydroxy-functional acrylic resins in water soluble salt form. An appropriate commercially available water insoluble heat-hardening benzoguanamine-formaldehyde resin is Uformite QR–336, a product of Rohm & Haas Company.

Broadly, the aminoplast helps the cure when used in proportions of 1-40 percent, preferably 5-30 percent, based on total resin, and these are frequently used to form films which cure more extensively and at lower temperature.

EXAMPLE 1

Preparation of 54% Methacrylic Acid, 6% Hydroxy-Ethyl Methacrylate and 40% Ethyl Acrylate High Molecular Weight Polymer

| Parts by Weight | |
|---|---|
| 825 | Distilled Water |
| 40 | Anionic Emulsifier |
| 0.8 | Potassium Persulfate |

Charge the above into a reactor equipped with a thermometer, stirrer, nitrogen inlet tube and addition funnel.

| | |
|---|---|
| 80 | Ethyl Acrylate |
| 108 | Glacial Methacrylic Acid |
| 12 | Hydroxy Ethyl Acrylate |

Premix the above monomers and add to the reactor over a two hour period at 75° C. Hold one hour at 80° C. Cool and discharge to provide a product having the following characteristics:

| | |
|---|---|
| Solids (percent) | 21.2% |
| Viscosity, Brookfield (Spindle No. 2, 60 r.p.m.) | 19 centipoises |

EXAMPLE 2

Polymer Composition:
60% Glacial Methacrylic Acid
40% Ethyl Acrylate

Parts by Weight

| | |
|---|---|
| 495 | Distilled Water |
| 25.6 | Anionic Surfactant |
| 0.4 | Potassium Persulfate |

Charge the above into a reactor equipped with an agitator, thermometer, nitrogen inlet tube and addition funnel Heat to 70° C.

| | |
|---|---|
| 72 | Glacial Methacrylic Acid |
| 48 | Ethyl Acrylate |

Add the above to the reactor over a two hour period at 70°–75° C. When monomer addition is complete, heat the batch to 85° C. and hold for 30 minutes. Cool to room temperature and discharge to provide an emulsion polymer having the following properties:

| | |
|---|---|
| Solids (percent) | 20.1 |
| Viscosity, Brookfield (Spindle No. 2, 60 r.p.m.) | 17.2 |

Different proportions of each of the polyacrylic acids of Examples 1 and 2 were utilized in electrocoating formulations and tested in order to evaluate the maximum deposition voltage, gloss, and film thickness obtained, as the concentration of polyacrylic acid is altered. The coating tested had the following composition:

86% Acrylic Copolymer - note 1
14% Melamine Resin - note 2

The coating was pigmented with titanium dioxide rutile at a pigment to binder ratio of 0.31/1. The coating was 100 percent neutralized with triethanol amine to pH 8.5 and had a resin solids content of 10 percent. In the tests, the temperature and time were held constant. The following results were obtained.

| % Polyacrylic Acid | Maximum Deposition Voltage | Film Thickness (mils) | Gloss (60°) |
|---|---|---|---|
| 0 | 125 | .9 | 82 |
| .120 | 125 | .9 | 79 |
| .168 | 150 | .9 | 80 |
| .230 | 150 | .8 | 81 |
| .302 | 175 | .8 | 69* |
| .350 | 175 | .8 | 45* |
| .390 | 225 | .8 | 41* |

*improved crater resistance

Note 2 — The acrylic copolymer utilized is a solution copolymer of 40% styrene, 48% butyl acrylate, and 12% glacial acrylic acid having a solids content of 7422-ethoxy ethanol, a Gardner viscosity of $Z_4$–$Z_5$, and an acid value (nonvolatile) of 104.

Note 2 — The melamine resin utilized is a 100% solids nonsoluble, but water dispersible melamine-formaldehyde condensate etherified with methanol and ethanol 60/40, and having a viscosity (Gardner) of z.

A further electrocoating composition was tested having the following composition:

60% Styrene-Allyl Alcohol Ester - Note 3
40% Benzoguanamine Resin - Note 4

The coating was pigmented with titanium dioxide rutile at a pigment to binder ratio of .4/1 and the coating was again 100% neutralized with triethanol amine. The following results were obtained.

| % Polyacrylic Acid | Maximum Deposition Voltage | Film Thickness (mils) | Gloss (60°) |
|---|---|---|---|
| 0 | 150 | .44 | 70 |
| .5 | 150 | .43 | 64* |
| 1.0 | 200 | .46 | 58* |

*improved crater resistance

Note 3 — The styrene-allyl alcohol ester is a water soluble ester prepared by esterification of 8.2 equivalents of styrene-allyl alcohol copolymer (hydroxy content 5.2%, equivalent weight 300) with 3.2 equivalents of tall oil fatty acids to an acid value of 4.0 and then reacted with trimellitic anhydride (1.64 equivalent) to an acid value of 26.8.

Note 4 — The benzoguanamine resin is an etherified resin dispersible in water (product XM-1123 of the American Cyanamid Company) and is recommended for electrocoating use. The product is utilized at 100% solids and has a Gardner viscosity of $Z_1$.

The invention is defined in the claims which follow.

We claim:

1. In the anodic electrophoretic deposition of carboxy-functional resin from an aqueous dispersion thereof, said resin being dispersed in water with the aid of a base, the improvement comprising incorporating in said aqueous medium from 0.1-3%, based on the total weight of resin, of a polyacrylic acid polymer having a molecular weight of at least about 20,000.

2. A method as recited in claim 1 in which said resin has a carboxyl functionality in the range of from about 5 to about 300.

3. A method as recited in claim 1 in which said acidic resin has a carboxyl functionality in the range of from 15-50.

4. A method as recited in claim 1 in which said aqueous medium includes an aminoplast resin.

5. A method as recited in claim 1 in which said aqueous medium includes dispersed pigment.

6. A method as recited in claim 1 in which said polyacrylic acid is an emulsion polymer.

7. A method as recited in claim 1 in which said polyacrylic acid is a copolymer including at least 20 percent by weight of acrylic or methacrylic acid copolymerized with monoethylenic monomers.

8. A method as recited in claim 7 in which said monoethylenic monomers include $C_1$ – $C_4$ esters of acrylic acid.

9. A method as recited in claim 8 in which said polyacrylic acid further includes up to 20 percent by weight of an hydroxy-functional monomer.

10. A method as recited in claim 1 in which said base is a volatile nitrogenous base.

11. A method as recited in claim 1 in which said carboxy-functional resin is an acidic acrylic copolymer comprising at least 25 percent by weight of $C_1 - C_4$ alkyl ester of acrylic acid.

12. A method as recited in claim 11 in which said acrylic copolymer has a carboxyl functionality in the range of from 12–80.

* * * * *

UNITED STATES PATENT OFFICE
CERTIFICATE OF CORRECTION

Patent No. 3,666,649      Dated May 30, 1972

Inventor(s) Kazys Sekmakas and Lester A. Henning

It is certified that error appears in the above-identified patent and that said Letters Patent are hereby corrected as shown below:

Column 4, line 2, "Note 2" should read --Note 1--

Column 4, line 5, "7422-ethoxy" should read -- 74% in 2- --

Signed and sealed this 2nd day of January 1973.

(SEAL)
Attest:

EDWARD M. FLETCHER, JR.           ROBERT GOTTSCHALK
Attesting Officer                 Commissioner of Patents